United States Patent [19]
McGrath

[11] Patent Number: 5,094,341
[45] Date of Patent: Mar. 10, 1992

[54] APPARATUS TO FACILITATE MOVEMENT OF OBJECTS OVER A SURFACE

[75] Inventor: Vincent J. McGrath, Auckland, New Zealand

[73] Assignee: McGrath Industries Limited, Auckland, New Zealand

[21] Appl. No.: 610,245

[22] Filed: Nov. 9, 1990

[30] Foreign Application Priority Data

Nov. 9, 1989 [NZ] New Zealand .................. 231334

[51] Int. Cl.$^5$ ......................................... B65G 25/00
[52] U.S. Cl. ...................................... 198/750; 198/772
[58] Field of Search ............... 198/779, 522, 750, 772; 193/35 TE

[56] References Cited

U.S. PATENT DOCUMENTS

| 2,105,142 | 1/1938 | Forsythe | 193/35 TE |
| 2,793,736 | 5/1957 | Thomson | 193/35 TE |
| 2,938,614 | 5/1960 | Hewitt, Jr. | 193/35 TE |
| 3,184,029 | 5/1965 | Loosli | 198/522 |
| 3,237,755 | 3/1966 | Weihe, Jr. | 198/779 |
| 3,780,843 | 12/1973 | McGovern, Jr. et al. | 193/35 TE |
| 3,876,060 | 4/1975 | Stease | 193/35 TE X |
| 3,944,037 | 3/1976 | Stease | 193/35 TE |
| 4,807,525 | 2/1989 | de Brock | 198/779 X |
| 4,830,166 | 5/1989 | Ottosson | 193/35 TE |

FOREIGN PATENT DOCUMENTS

| 826425 | 1/1952 | Fed. Rep. of Germany | 198/522 |
| 1112561 | 11/1955 | France | 193/35 TE |
| 0188210 | 11/1983 | Japan | 193/35 TE |
| 1454765 | 1/1989 | U.S.S.R. | 193/35 TE |
| 2167368 | 5/1986 | United Kingdom | 193/35 TE |

Primary Examiner—D. Glenn Dayoan
Attorney, Agent, or Firm—Fleit, Jacobson, Cohn, Price, Holman & Stern

[57] ABSTRACT

An apparatus for efficiently moving containers, cargo and similar objects (39) over a surface includes two parallel chains (1, 2) of links (3) with rollers (4, 5) perpendicular to and attached between the chains, alternate rollers projecting upwardly (4) and downwardly (5), respectively. The apparatus is preferably provided in association with a retrieving and dispensing apparatus (27, 28, 29, 31) so that the rollers can be positioned on a surface (32) and removed therefrom.

18 Claims, 4 Drawing Sheets

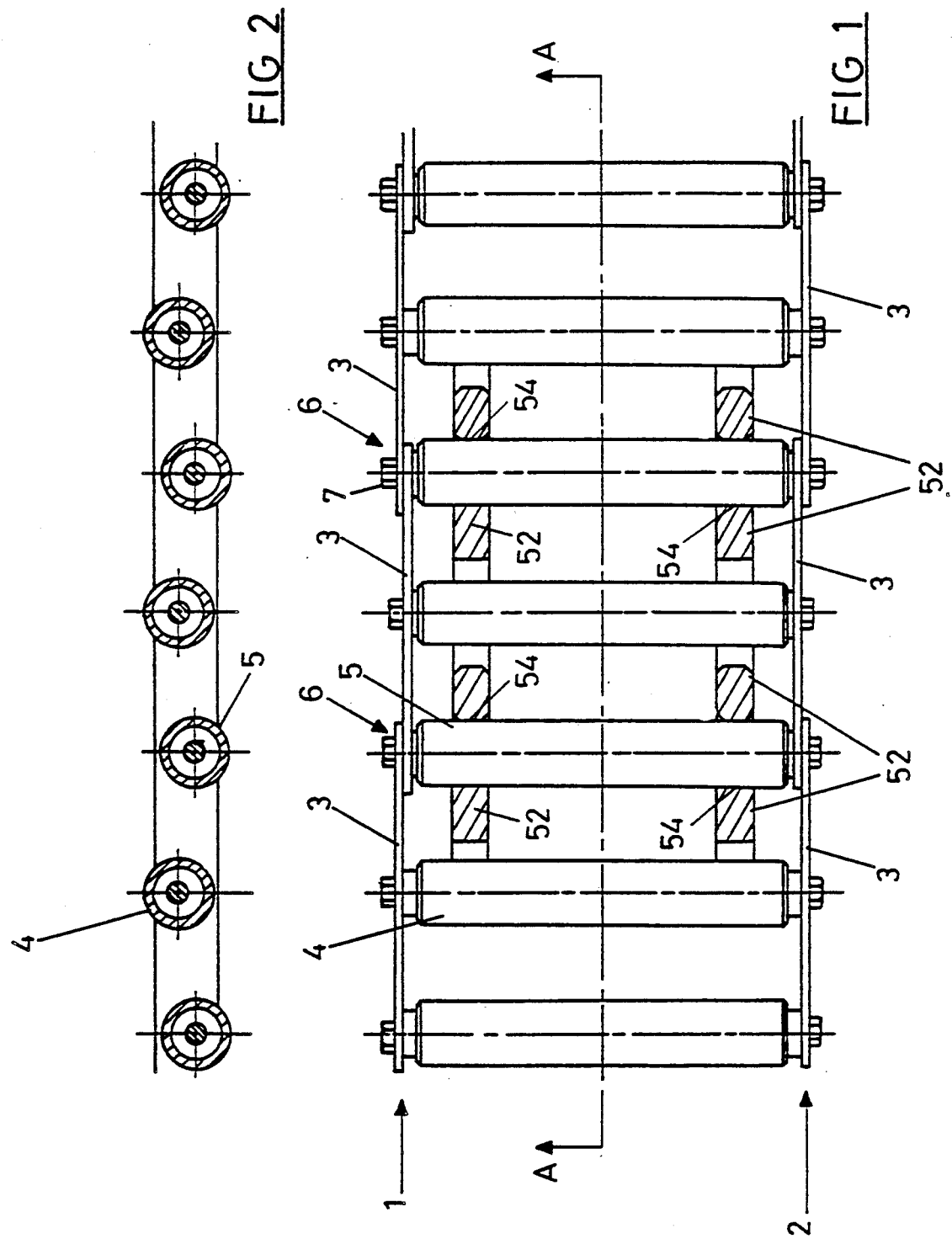

APPARATUS TO FACILITATE MOVEMENT OF OBJECTS OVER A SURFACE

BACKGROUND OF THE INVENTION

This invention relates to an apparatus to facilitate movement of containers and other objects over a surface, and is intended particularly though not necessarily solely to provide an apparatus to facilitate the loading and unloading of cargo containers from the beds of trucks for example. Further, the apparatus of the invention enables freight containers to be readily and efficiently loaded and unloaded.

Efficient transport of goods from one location to the next is reliant on suitable mechanisms for transfer of the goods between transporting vehicles such as from the cargo hold of a plane to the deck of a truck. In order to facilitate efficient loading of trucks, commercial trucks may be fitted with a rollerized deck. However, some trucks do not have rollerized decks and this slows down the loading process.

Another area of the overall transportation process that is reliant on efficient transfer mechanisms is the loading and unloading of containers such as air or sea freight containers. This process generally involves loading (or unloading) the containers with loads preassembled into a mass of known dimensions which will fit the container exactly. These preassembled loads also need to be loaded and unloaded onto road vehicles as part of the overall distribution process.

In order to move cargo and containers from one location to another forklifts are generally used, but the forks thereof often damage the cargo or goods.

BRIEF SUMMARY OF THE INVENTION

Therefore, it is an object of the instant invention to provide an apparatus to facilitate movement of containers over a surface which will overcome the foregoing disadvantages.

Accordingly, in one aspect, the invention may broadly be said to consist in an apparatus to facilitate movement of containers, cargo or the like, over a surface comprising;

two parallel chains of links, a plurality of rollers perpendicular to and attached between the two chains with at least some of the rollers projecting above the upper edge of the links, and others of the rollers projecting below the lower edge of the links.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One presently preferred form of the invention will now be described in detail with reference to the accompanying drawings, wherein;

FIG. 1 is a top plan view of a roller/chain apparatus to facilitate movement of containers over a surface according to the invention;

FIG. 2 is a cross-sectional view taken along line A—A of FIG. 1;

FIG. 4b is a top plan view of the pawl arrangement of FIG. 4a; and

DETAILED DESCRIPTION

Figure 3A:
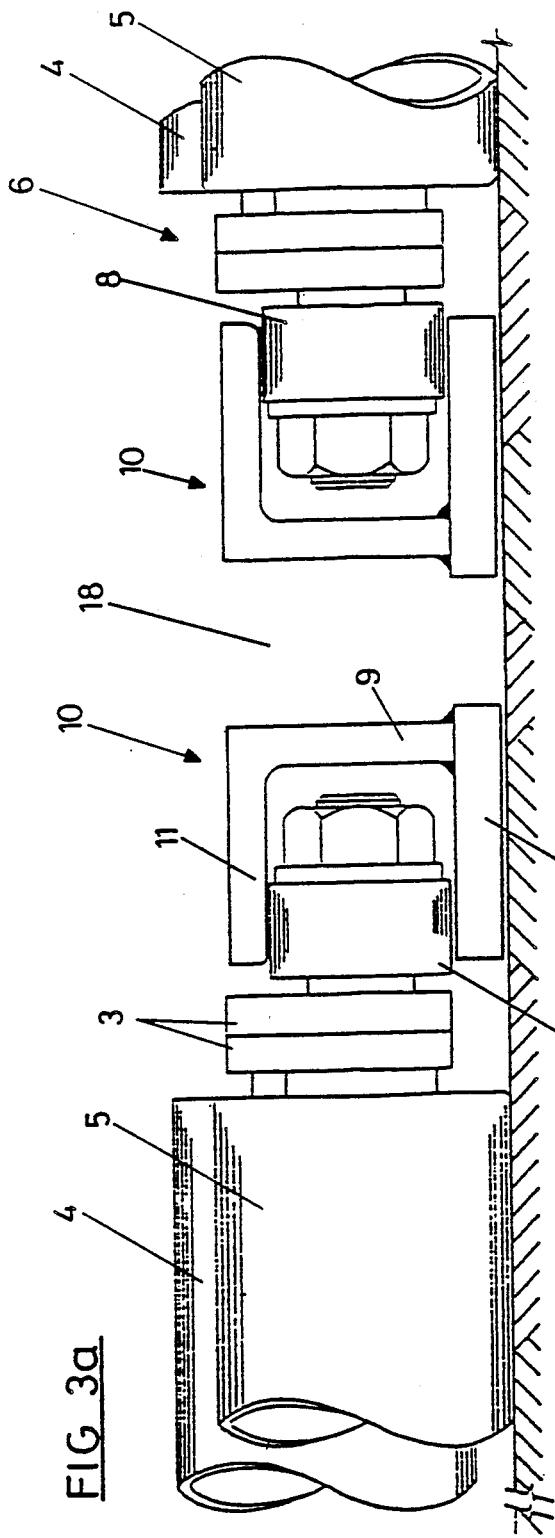
FIG. 3a is a front elevational view of parts of two adjacent rollers for use in an open array arrangement of rollers according to one preferred form of the invention.

Referring now to the figures, an apparatus is provided to facilitate movement of containers over a surface, such as when loading and unloading cargo containers onto or off a truck deck. The apparatus can also be used to load and unload freight into and out of containers.

The apparatus comprises two parallel chains 1 and 2 consisting of links 3, and a plurality of rollers 4 and 5 perpendicular to the chains 1 and 2 and attached between the chains, preferably by way of a substantially rigid axial mounting 7.

Some of the rollers, indicated at 4, project only above the upper edge of the links 3, while others of the rollers, indicated at 5, project only below the lower edge of the links 3 (as can be seen in FIG. 2). Thus, when the chains 1 and 2 are laid out along a surface, the downwardly projecting rollers 5 contact the surface and bear the load of the roller/chain apparatus and of anything resting on the roller/chain apparatus, while the upwardly projecting rollers 4 contact an object placed on the roller/chain apparatus.

The downwardly projecting rollers 5 are preferably attached to the chains 1 and 2 at, or substantially at, points of articulation 6 of the links 3. The bearing of the load at these points can prevent the chains 1 and 2 buckling at the points of articulation 6 when the rollers 5 are load bearing against the surface.

The upwardly projecting rollers 4 are preferably positioned alternately with the downwardly projecting rollers 5, they are preferably evenly spaced. The upwardly projecting rollers 4 are for example attached at the center of each link 3.

Preferably more than one, for example 3, sets of chains 1 and 2 with associated rollers 4 and 5 are provided horizontally adjacent one another.

Figure 3B:
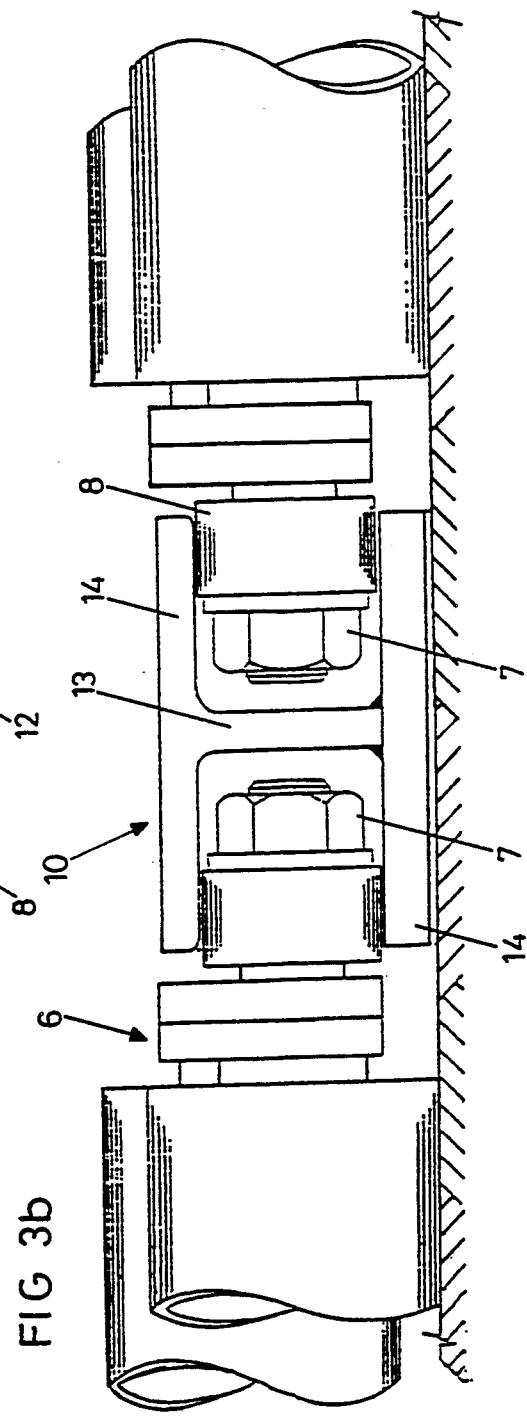
FIG. 3b is a view similar to FIG. 3a of part of two adjacent rollers for use in a closed array arrangement of rollers according to an alternative preferred form of the invention.

As shown in FIGS. 3a and 3b, guide rollers 8 are preferably provided between the axial mounting 7 and points of articulation 6 of the links 3. These guide rollers 8 are preferably provided on each side of the downwardly projecting rollers 5 so that the guide rollers 8 are cantilevered from the chain links 3.

The guide rollers 8 may ride within the confines of a guide rail 10 which serves to ensure that the rollers 4 and 5 run straight. This guide rail 10 provides support to the roller/chain apparatus from its point of engagement with a drive sprocket 27 (see FIG. 5) through to its point of disengagement therefrom and to the point where the roller/chain apparatus encounters a load. As shown in the embodiment of FIG. 3a, the guide rail 10 may include an upper and lower member, 11 and 12 respectively, joined by a vertical web 9. The guide rail 10 is of suitable dimensions with sufficient spacing between members 11 and 12 so that the guide rollers 8 run with suitable clearance therein.

Alternatively, as shown in FIG. 3b, the guide rail may comprise a vertical web 13 and horizontal extensions 14 in opposite directions such that two adjacent rails are provided.

Explaining the function of the embodiments shown in FIGS. 3a and 3b, FIG. 3a shows an open array arrangement of the roller/chain apparatus. In this form of the invention, several, for example three, sets of chains 1 and 2 with rollers 4 and 5 are provided adjacent one another. The guide rollers 8 are positioned in their respective guide rails 10 such that an interval 18 is provided between the adjacent chains 1 and 2 of rollers 4 and 5. Thus, once the container or similar object has been located in position using the apparatus, dunnage can be inserted under the load in the interval 18 and the sets of chains 1 and 2 can then be removed. The dunnage provides support to the load in transit. This is advantageous, as the effort required to reintroduce the chains 1 and 2 beneath the load when it arrives at its next destination is significantly reduced. This open array positioning of successive chains is particularly suitable where the load is of uniform configuration such as a container.

FIG. 3b shows a closed array display of the chains of rollers. In this embodiment, the adjacent sets of chains and 2 are positioned substantially close together. This closed array is more suitable where the load to be relocated is not uniform in dimensions as this arrangement of the sets of chains 1 and 2 ensures that the weight of the load is more evenly balanced over the rollers 4 and 5.

Of course it will be appreciated by those skilled in the art that the number of sets of chains 1 and 2 required to move a load can be reduced by providing wider rollers 4 and 5.

The apparatus can be used to elevate and relocate heavy items such as an oil drum from the deck of a truck to a new location for example. The invention has been adapted so that loads with uneven weight distribution such as an oil drum bearing weight through its legs can be efficiently moved.

Figure 4B:
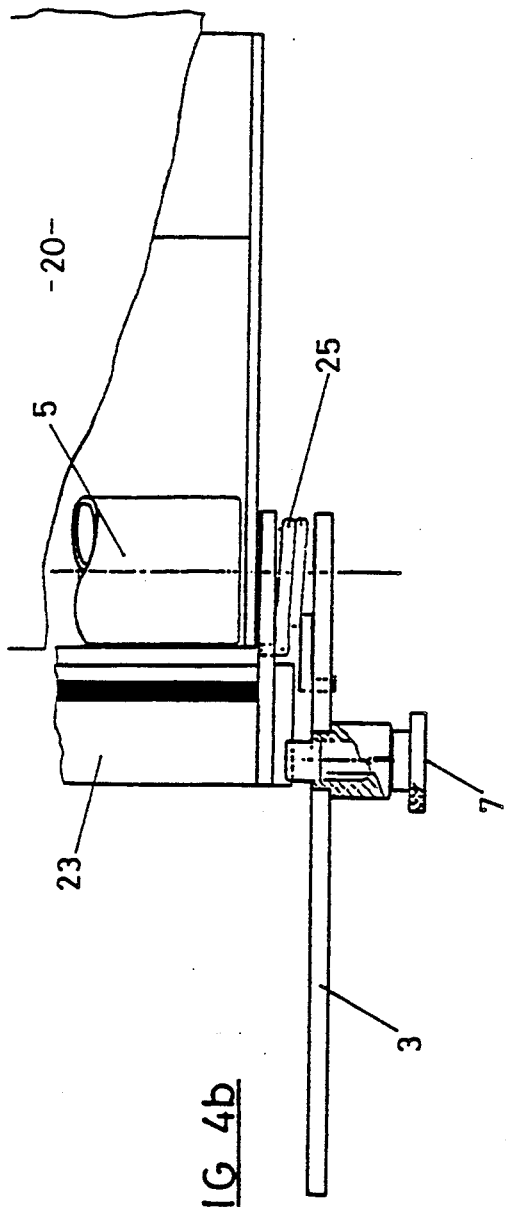
Figure 4A:
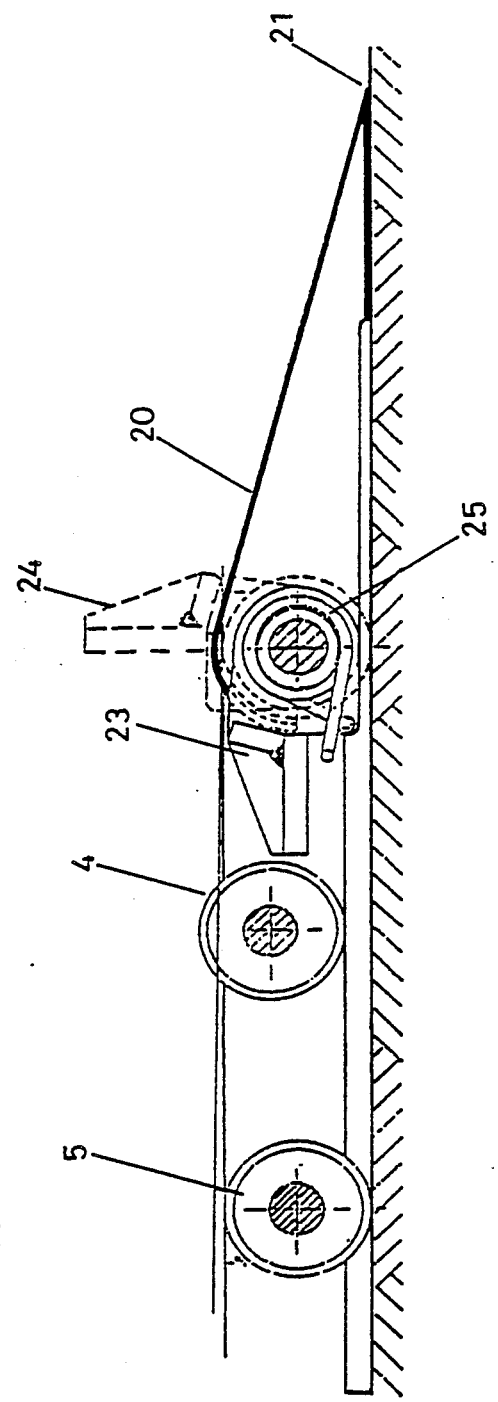
FIG. 4a is a cross-sectional side elevation of a plough and pawl arrangement for use in a roller/chain apparatus according to one preferred form of the invention.

With specific reference to FIGS. 4a and 4b, the leading edge of the sets of chains 1 and 2 may include a plough 20. The plough 20 is preferably attached to the leading downwardly projecting roller 5. The plough 20 may comprise a substantially triangular member in cross section and may taper to a point 21 which can be positioned under an article. By way of example, an oil drum can be positioned on a substantially flexible member such as disposable low grade plywood, MDF, and hardboard for example. Alternatively, permanent membranes fabricated from suitable sheet products can be utilized. The member serves to distribute the weight of the load positioned thereon more evenly. The point 21 of the plough 20 can then be driven under the member by dispensing the chains 1 and 2.

The apparatus may also include an additional feature comprising a locating pawl 23. This locating pawl 23 is desirable where the apparatus is used to move a container or a load from the back of a truck to a new location for example. With reference to FIG. 4a, the pawl 23 is in a downward position when an object is riding on the plough 20 thus forcing the pawl 23 down. Once the object being moved is positioned on the upward facing rollers 4, the pawl 23 emerges from under the object and is then provided in an upward position as shown by the dotted lines at 24. Thus the upward directed pawl 24 bears against the vertical surface of the side of the load. The individual chains 1 and 2 of rollers 4 and 5 can then be recoiled and the object will move therewith. Thus the load can be relocated for example inside a container.

The apparatus includes a torsion spring 25 which facilitates the functioning of the spring pawl 23. The pawl 23 is thus mounted adjacent the leading roller which is preferably a ground roller 5. The torsion spring 25 is mounted in an axial position with regard to the roller 5. The pawl 23 preferably extends horizontally at least the length of the roller 5.

The roller/chain apparatus of the invention may be provided with a chain retrieving/dispensing apparatus, in one preferred form of the invention. The retrieving/dispensing apparatus includes a sprocket wheel or wheels 27 to sequentially engage with the rollers 4 and 5, or links 3 of adjacent chains 1 and 2 of rollers 4 and 5, so that as the sprocket wheel 27 rotates the chain/roller apparatus is extended or retracted. The sprocket teeth 52 preferably include notches 54 which engage with the rollers 4 and 5, as can be seen in FIG. 1. A motor 28 is suitably provided to rotate the sprocket wheel 27 thus facilitating extension and retraction of the chain/roller apparatus.

The sprocket wheel 27 is able to feed the chains 1 and 2 to recoiler or recoilers 29. The recoilers 29 are preferably mounted on a common shaft. The recoilers 29 comprise adjacent rotating drums, one per pair of chains 1 and 2. The drums have side flanges and the gap between the flanges is adapted so that an individual chain of rollers can be positioned around the circumference of the recoiler 29. This avoids telescoping of the layers of chains 1 and 2. The recoiler 29 is vital to the operation of the chain apparatus in the unloading operation. In operation, a consistent torque is provided in the direction of the arrow 30 which is opposite to the direction of rotation of the sprocket 27 when it is feeding out the chains 1 and 2. Creation of this torque serves to ensure that the chain 41 positioned between the sprocket 27 and recoiler 29 is always under tension. Any known drive mechanism can be used to create the torque in the recoiler 29. For example, a hydraulic mechanism can be used to impart torque as this mechanism is able to impart torque under moving or stalled conditions. Facilities for adjusting the torque should also be available in the preferred embodiment of the invention.

The retrieving/dispensing apparatus preferably forms part of a dock leveller 31. The dock leveller 31 ensures that the height between the deck 32 of a truck 48 backed against the dock leveller 31 is level with the adjacent dock. The dock leveller 31 may for example be attached to the dock by a pivot 50. A dock levelling ram 33 may for example be provided which is hydraulically operated and so that it serves to adjust the height of the dock leveller 31.

An upright member 34 may be provided and a buffer 35 may be attached to this such that the rear portion 36 of an incoming truck 48 is positioned substantially adjacent the dock leveller 31. Where the deck 32 of the truck 48 includes an upright ridge at its end portion 36 it is desirable to provide a height adjuster 37. This may for example be hinged and form part of the guide rail 10. The height adjuster 37 may be connected to microswitches and may respond to variations in height of the deck 32 by adjusting the height of the dock leveller 31.

An additional apparatus may be provided in conjunction with the chain roller apparatus in one preferred form of the invention. One or more makeup/breakdown conveyors 40 may be provided. The makeup/breakdown conveyor 40 is pivotally mounted to the dock leveller 31 at its front end 49 so that it can adjust to height variations as required. Thus a load 39 of finite dimensions may be assembled on the makeup/breakdown conveyor 40 and rotation of the conveyor causes the load 39 to move towards the chain/roller apparatus. The head sprocket of the conveyor 40 is desirably immediately adjacent the sprocket 27. A supplementary roller such as a GII roller 42 may be provided between the roller/chain apparatus and the makeup/breakdown conveyor to give support to the load as it transfers between them.

For servicing six meter long containers or trucks only one makeup/breakdown conveyor 40 need be provided. The conveyor 40 is pivotally mounted to the floor at the rear end 46. This ensures the makeup/breakdown conveyor 40 is able to respond to variations in height of the dock leveller 31. Thus the overall apparatus is able to adjust to a variety of truck try or container heights.

When the apparatus is used to load 12 meter long containers generally two makeup/breakdown conveyors are provided. The second conveyor 43 is for example permanently affixed to the ground at a height equivalent to the adjacent end of the first conveyor 40.

Usually, when a truck 32 backs against the dock leveller 31, the longitudinal center line is not coincident with the longitudinal center line of the dock leveller 31. The error in positioning will generally not exceed plus or minus 50 mm. However, it is desirable to provide particular features which facilitate adjustment for this difference. In order to compensate for this error, hydraulic jacks may be provided at the rear and front ends of the conveyor (44 and 45 respectively). These hydraulic jacks 44 and 45 ensure that the conveyor 40 can be side shifted on its mounting thus achieving coincidence between the centerline of the truck 48 and container 39.

The use of the invention according to the preferred embodiment will now be described.

The invention facilitates the loading of cargo containers onto a flat bed truck 48 which is not provided with a rollerized deck.

Figure 5:
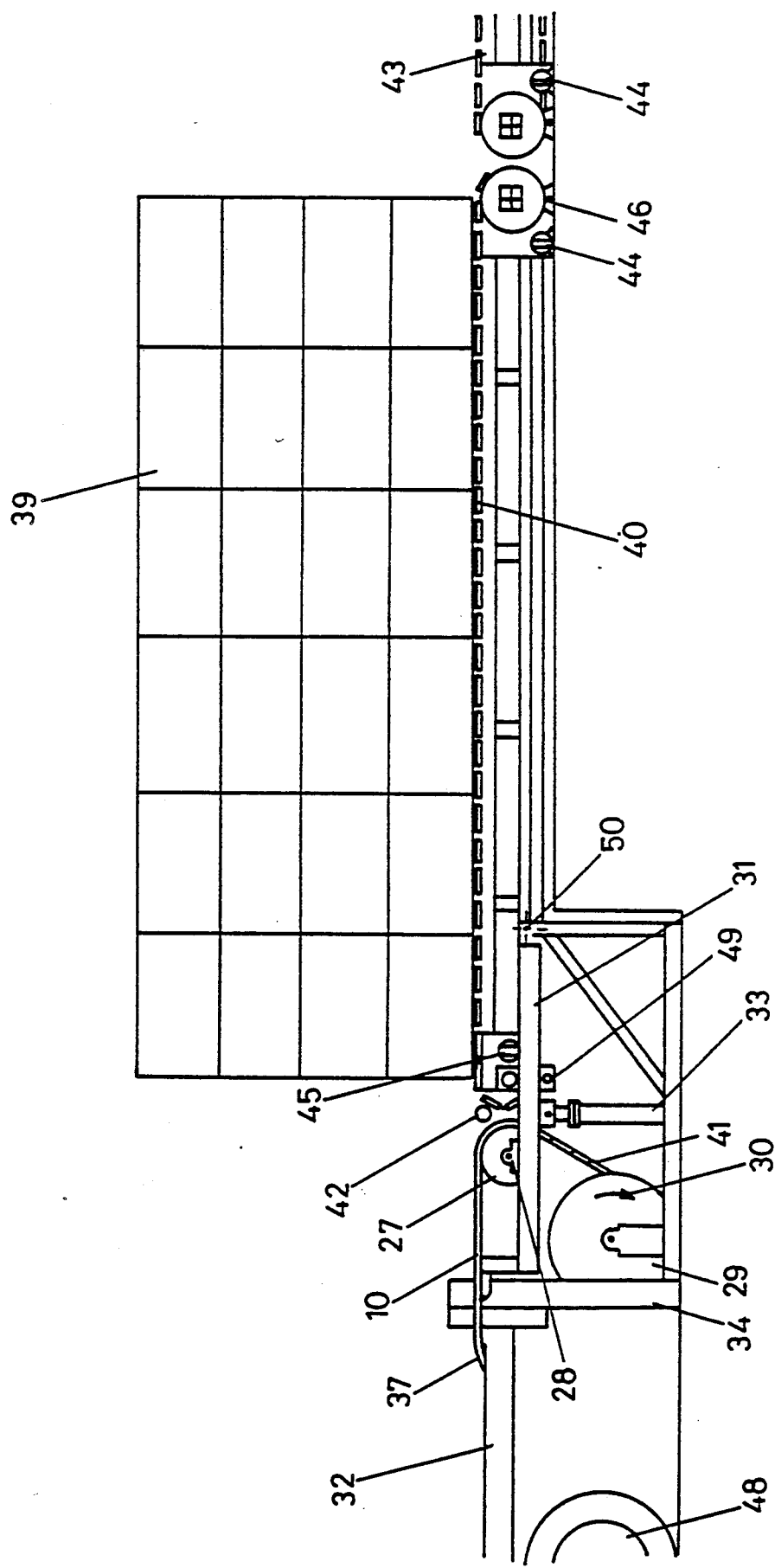
FIG. 5 is a side elevational view of a roller/chain apparatus and associated makeup/breakdown conveyors according to one preferred form of the invention.

Initially, as shown in FIG. 5, the dispensing/retrieving apparatus carrying the chain/roller apparatus of the invention in a retracted position, is positioned against the back 36 of a truck 48. The height of the dock leveller 31 may be adjusted to match the height of the truck deck 32. The motor 28 of the sprocket 27 is then operated to rotate the sprocket wheel 27 and feed out the chain/roller apparatus along the bed 32 of the truck. It may also be possible to manually extend the chain/roller apparatus. As the chain/roller apparatus extends, it rolls along the back of the truck 32 on downwardly extending rollers 5.

Once the chain/roller apparatus is extended the desired distance along the truck bed 32, a container, such as cargo container 39, is brought level with the truck bed 32. This may be achieved as a result of alterations to the height of conveyor 40 via pivot 49. By operating the conveyor 40, the load 39 passes over GII roller 42 to the chain/roller apparatus. Once positioned on the roller chain apparatus, the container 39 rests on the upwardly extending rollers 4. The load is borne onto the truck bed 32 through the downwardly extending rollers 5. The container 39 can then continue to be readily moved as a result of its original momentum, or manually, as desired along the bed 32 of the truck 48, rolling on the upwardly extending rollers 4.

Once the truck 48 is fully loaded, bracing or retaining struts (not shown) may be inserted at the rear of the truck bed to retain the container or load 39 on the deck 32 of the truck 48. The motor 28 of the sprocket 27 can then be operated to retract the chain/roller apparatus from under the container 39. Any tendency of the container 39 to move back with the retracting chain/roller apparatus will be checked by the struts.

In a further preferred form of the invention the apparatus may be used to retrieve a load from the back of a truck for example. In this instance, the plough 20 of the roller chain apparatus is positioned under the load as a result of rotation of the sprocket 27 for example. As discussed, the load such as an oil container can be positioned on a flexible membrane. If more than one membrane is to be used these can be overlapped so that the plough 20 will continue to drive beneath the membranes. The load thus moves up the plough and onto the rollers 4 while the rollers 5 bear against the truck surface and move the roller/chain apparatus under the load. Once the pawl 23 emerges from beneath the load to position 24 the chain apparatus can be retrieved. The pawl will be positioned against the rear end of the load thus dragging in the load to the required location.

Thus it can be seen that an apparatus is provided to facilitate the movement of containers or a preassembled load along a surface, which is advantageous in that it can be extended and withdrawn over various surfaces at various heights, and is particularly useful for loading cargo containers on to flat bed trucks which are not rollerized without the use of forklifts which can result in damage to the containers. The apparatus can also be used for loading goods such as timber or oil drums into containers.

I claim:

1. Apparatus to facilitate movement of articles including containers, cargo and similar objects over a surface comprising:
   at least one flexible roller chain comprising,
      two parallel chains each formed by link members pivotally connected together and having upper and lower edges,
      a plurality of rollers having ends supported by said links and extending perpendicular to and between said chains, and
      an outer end with a leading roller thereon for first contacting an article in use,
      at least some of said rollers having outer surfaces thereof projecting above said upper edges of said links and others of said rollers having outer surfaces thereof projecting below said lower edges of said links; and
   a retrieving/dispensing apparatus comprising,
      at least one sprocket means having a sprocket wheel engaging said at least one roller chain,
      means for driving said sprocket wheel reversibly so that rotation thereof in an extending direction moves said outer end of said at least one roller chain toward the article and away from said sprocket wheel, and rotation in the opposite retracting direction moves said outer end of said at least one roller chain toward said sprocket wheel, and
      recoiler means engaging said at least one roller chain for coiling said at least one roller chain when said sprocket wheel is rotated in said retracting direction.

2. An apparatus as claimed in claim 1 wherein said rollers projecting below said lower edges of said links are attached to said links at positions substantially coincident with pivotal connections of said links.

3. An apparatus as claimed in claim 1 wherein said rollers projecting above said upper edges are positioned alternately with said rollers projecting below said lower edges of said links.

4. An apparatus as claimed in claim 1 wherein said at least one roller chain comprises a plurality of roller chains arranged in an array.

5. An apparatus as claimed in claim 1 wherein:
said sprocket wheel has a plurality of sprocket teeth; and
notch means are provided in said sprocket teeth for engagement with said rollers.

6. An apparatus as claimed in claim 5 wherein said means for driving said sprocket wheel comprises motor means operatively connected to said sprocket wheel.

7. An apparatus as claimed in claim 6 wherein said recoiler means comprises at least one rotating drum and side flanges on said drum, said at least one roller chain being positioned between said flanges in use.

8. An apparatus as claimed in claim 1 and further comprising support members for supporting said two chains of said at least one roller chain in use.

9. An apparatus as claimed in claim 8 wherein said support members comprise:
guide rails each having at least one elongated guide slot therein; and
guide rollers adjacent to said rollers projecting below said lower edges of said links, and in rolling engagement in said guide slots in use.

10. An apparatus as claimed in claim 9 and further comprising:
a levelling apparatus, said sprocket means being supported on said levelling apparatus; and
means for raising and lowering said levelling apparatus for adjusting the height of said sprocket means and at least one roller chain thereon with respect to varying heights of vehicles positioned adjacent thereto.

11. An apparatus as claimed in claim 10 and further comprising:
a height adjustment means operatively connected to said levelling apparatus for controlling said raising and lowering means for compensating for variations in height of vehicles positioned adjacent thereto.

12. An apparatus as claimed in claim 11 wherein said height adjustment means comprises a height adjustment member attached to outer ends of said guide rails which contact a vehicle in use.

13. An apparatus as claimed in claim 1 wherein:
at least one conveyor is provided substantially adjacent said retrieving/dispensing apparatus.

14. An apparatus as claimed in claim 13 wherein:
said at least one conveyor comprises adjustment means for adjusting the height and horizontal displacement of said conveyor.

15. An apparatus as claimed in claim 14 wherein a support roller is provided between said at least one conveyor and said retrieving/dispensing apparatus.

16. Apparatus to facilitate movement of articles including containers, cargo and similar objects over a surface comprising:
two parallel chains each formed by link members pivotally connected together and having upper and lower edges;
a plurality of rollers having ends supported by said links and extending perpendicular to and between said chains so that said rollers and chains form an elongated flexible roller chain having an outer end with a leading roller thereon for first contacting an article in use;
at least some of said rollers having outer surfaces thereof projecting above said upper edges of said links and others of said rollers having outer surfaces thereof projecting below said lower edges of said links; and
a pawl member movably mounted on said roller chain adjacent said leading roller for movement between a retracted position below the article under the weight of the article when substantially vertically imposed on said pawl member and a raised position above said roller chain when said pawl member is not under said substantially vertical weight of the article.

17. The apparatus as claimed in claim 16 and further comprising:
a retaining surface on said pawl member adapted to extend upwardly in said raised position for engagement with an upwardly extending surface on the article.

18. The apparatus as claimed in claim 17 and further comprising:
spring means between said pawl member and said roller chain for resiliently urging said pawl member toward said raised position.

* * * * *